US010355633B2

United States Patent
Kobylanski (10) Patent No.: US 10,355,633 B2
(45) Date of Patent: Jul. 16, 2019

(54) METHOD AND CONTROL DEVICE OF A MULTIPHASE SYNCHRONOUS ROTATING ELECTRIC MACHINE WITH EXCITATION AND CORRESPONDING VEHICLE ALTERNO-STARTER

(71) Applicant: Valeo Equipements Electriques Moteur, Creteil (FR)

(72) Inventor: Luc Kobylanski, Creteil (FR)

(73) Assignee: Valeo Equipements Electriques Moteur, Creteil (FR)

( * ) Notice: Subject to any disclaimer, the term of this patent is extended or adjusted under 35 U.S.C. 154(b) by 0 days.

(21) Appl. No.: 15/770,653

(22) PCT Filed: Oct. 25, 2016

(86) PCT No.: PCT/FR2016/052774
§ 371 (c)(1),
(2) Date: Apr. 24, 2018

(87) PCT Pub. No.: WO2017/072440
PCT Pub. Date: May 4, 2017

(65) Prior Publication Data
US 2018/0323739 A1    Nov. 8, 2018

(30) Foreign Application Priority Data

Oct. 26, 2015    (FR) ..................... 15 60181

(51) Int. Cl.
*H02P 6/08*    (2016.01)
*H02P 27/08*    (2006.01)

(52) U.S. Cl.
CPC ............. *H02P 27/085* (2013.01); *H02P 6/08* (2013.01)

(58) Field of Classification Search
CPC ................. H02P 27/085; H02P 6/08
(Continued)

(56) References Cited

U.S. PATENT DOCUMENTS

2003/0146723 A1*   8/2003   Pavlov ................. H02P 21/13
                                                                                    318/432
2010/0207568 A1   8/2010   Bodin et al.
(Continued)

FOREIGN PATENT DOCUMENTS

EP    2128427 A1   12/2009
EP    2219288 A1   8/2010
(Continued)

OTHER PUBLICATIONS

International Search Report issued in PCT/FR2016/052774 dated Mar. 7, 2017 (3 pages).
(Continued)

*Primary Examiner* — Kawing Chan
(74) *Attorney, Agent, or Firm* — Osha Liang LLP (57) ABSTRACT

The inventive method is of the type of those comprising a control stage for driving mode operation of the machine (12) in which currents of the phases in phase windings (u, v, w) of a stator (10) of the machine, which is connected to an on-board power system (2, 15) supplied by a battery (2) providing a predetermined nominal voltage (Ubat), is "full wave" controlled. In accordance with the invention, the control stage is preceded by a pre-magnetizing stage of the stator in open circuit, in which an electromotive peak force between phases substantially equal to the nominal voltage is created by a rotor excitation current (Ir) of a rotor (8) of the machine.

9 Claims, 7 Drawing Sheets

(58) Field of Classification Search
USPC .......................................................... 318/139
See application file for complete search history.

(56) References Cited

U.S. PATENT DOCUMENTS

| | | | | |
|---|---|---|---|---|
| 2010/0301789 | A1* | 12/2010 | Pollock | ..................... H02P 6/10 |
| | | | | 318/400.23 |
| 2012/0298062 | A1 | 11/2012 | Granziera | |
| 2015/0229261 | A1* | 8/2015 | Knuutila | ................. H02P 25/22 |
| | | | | 318/400.02 |

FOREIGN PATENT DOCUMENTS

| | | | |
|---|---|---|---|
| FR | 2745445 | B1 | 5/1998 |
| FR | 2895597 | B1 | 9/2008 |
| WO | 2006/097789 | A2 | 9/2006 |

OTHER PUBLICATIONS

Written Opinion issued in PCT/FR2016/052774 dated Mar. 7, 2017 (7 pages).

* cited by examiner

METHOD AND CONTROL DEVICE OF A MULTIPHASE SYNCHRONOUS ROTATING ELECTRIC MACHINE WITH EXCITATION AND CORRESPONDING VEHICLE ALTERNO-STARTER

TECHNICAL FIELD OF THE INVENTION

The present invention relates to a method and a control device of a multiphase synchronous rotating electric machine with excitation.

The invention also relates to a vehicle alterno-starter comprising such a device.

TECHNOLOGICAL BACKGROUND OF THE INVENTION

Considerations of energy saving and pollution reduction, especially in the urban environment, lead the automobile manufacturers to equip their models with an automatic start/stop system, such as the system known under the Anglo-Saxon term of "stop and go".

A typical "stop and go" situation is that of stopping at a red traffic light. When the vehicle stops at traffic lights, the thermal engine is switched off automatically, then, when the traffic lights turn green, the engine is started again by means of the alterno-starter, after the system has detected depression of the clutch pedal by the driver or any other action translating the intention of the driver to re-start his or her vehicle.

A three phase alternator able to function as a starter, that is to say as an electric motor, is described by VALEO ELECTRONIQUE in French patent application FR2745445.

A rectifying bridge on the output of the alternator armature is also used as a bridge to control the phases of the electric motor, power transistors of the arms of the bridge being controlled by sequences of square signals issued by a control unit.

Such full wave control of the "all or nothing" type is well-known to the person skilled in the art and is very simple to implement.

In the latest alterno-starters, a multiphase synchronous rotating electric machine is connected to a reversible AC/DC converter—or inverter—supplied by the main battery in driving mode and by the electric machine in generating mode.

The development of digital technology enables the inverter controlled by modulating the pulse width, commonly called MLI or PWM ("Pulse Width Modulation" in English) inverter to obtain precise control of the electric machine for each particular operating condition.

Examples of MLI commands generated by a microprocessor running programs are described in French patent application FR2895597 under the name of VALEO EQUIPEMENTS ELECTRIQUES MOTEURS.

However the inventive entity was confronted with the problem of limiting the commutation frequency of inverters on electric machines with a large number of poles per phase which rotate quickly.

In fact the software processing which leads to the issue of cyclical reports of MLI commands requires a frequency of the MLI signals considerably higher than an electrical frequency corresponding to the number of revolutions of the machine (typically more than an order of magnitude).

Due to limiting the commutation frequency of the inverters, it is difficult to achieve these ratios if a number of pairs of poles per phase is great (an electric pulsing is equal to the number of revolutions multiplied by the number of pairs of poles per phase).

A solution normally used in these circumstances is to control the phases in full wave mode using a traditional method, that is to say by generating a square waveform at an electric frequency of the machine, based on a predetermined number of nominal revolutions.

Also an operating mode in which the machine is not controlled in an active way and no longer interacts with the electrical network is needed for the machine to function. Such a mode is especially necessary as fallback mode in the event of defect. This mode can also be used when there is no defect, in situations where the machine does not have to provide or consume electrical energy.

The use of a machine with wound excitation enables this mode to be used by cancelling the rotor excitation current and by opening the control switches in order to isolate the phases of the machine from the on-board power system. Another embodiment of such a mode consists in cancelling the rotor excitation current and closing certain control switches in order to short-circuit the phases of the machine.

However it was found by the inventive entity that abrupt transition between this passive mode and a full wave command produced a high peak current.

GENERAL DESCRIPTION OF THE INVENTION

The present invention thus aims at limiting this current peak.

More precisely it is directed to a method of controlling a multiphase synchronous rotating electric machine with excitation of the type of those comprising a control stage in which currents of the phases in phase windings of a stator of the machine are controlled in full wave mode.

This machine is connected to an on-board power system supplied by a battery providing a predetermined nominal voltage for when the machine operates in driving mode.

In the inventive method, this stage of control in full wave mode is preceded by a pre-magnetizing stage of the stator in open circuit in which an electromotive peak force between phases substantially equal to the nominal voltage is created by an excitation current of a rotor of the machine.

According to the invention, this pre-magnetizing stage includes determination of a reference value for the rotor excitation current as a function of an electric pulsing of the machine With the inventive method the phase currents being controlled by an inverter, in a particular embodiment comprising arms formed, on the one hand, by first power switches regulated by control circuits supplied by commutation-triggering capacitors known as "bootstrap" capacitors and connecting the phase windings to a positive terminal of the on-board power system, and on the other hand, by second power switches connecting the phase windings to an earth terminal of this electrical network, the pre-magnetizing stage moreover includes a sequence of charging these "bootstrap" capacitors.

A "bootstrap" capacitor is understood to mean a passive supply floating capacitor brought to the potential of the phase.

According to the invention, during this sequence, the second power switches are controlled depending on an electrical position of the rotor so that only the one of the phases of the machine with the lowest electromotive force between phases is commutated to the earth terminal.

Again according to the invention, the pre-magnetizing stage is passed to the full wave control stage when the rotor excitation current has reached the reference value and when the "bootstrap" capacitors are charged.

In the method of controlling an inventive multiphase synchronous rotating electric machine with excitation, the rotor excitation current being controlled by a commutation element regulated by a control circuit supplied by a "bootstrap" capacitor, this "bootstrap" capacitor is charged before the pre-magnetizing stage.

The invention also relates to a control device for a multiphase synchronous rotating electric machine with excitation able to implement the method described above, of the type of those comprising an electronic control unit governing:
- an inverter connected to an on-board power system supplied by a battery and intended to be connected to phase windings of a stator of this machine;
- a control circuit connected to the on-board power system and intended to be connected to an excitation winding of a rotor of the machine.

According to the invention, this electronic control unit comprises:
- means to acquire a number of revolutions of the machine;
- a first peripheral device to generate first signals controlling the inverter;
- means to compare the number of revolutions with a number of predetermined nominal revolutions;
- a second peripheral device to generate a second signal controlling the control circuit;
- a central processing unit.

This processing unit carries out:
- a first subroutine or a second subroutine, by means of the first peripheral, to generate the first signals so as to produce respectively first phase pulse width modulated voltages or second full wave phase voltages depending on a state of the means of comparison;
- prior to the second subroutine, a third subroutine to determine a rotor excitation current depending on the number of revolutions and by means of the second peripheral device to generate the second signal so as to produce a magnetic pre-magnetizing flux in the stator and a fourth subroutine, by means of the first peripheral device, to generate the first signals so as to maintain the stator in open circuit; using the means to memorize these first, second, third and fourth subroutines.

In a particular embodiment of the device according to the invention, the inverter comprises arms formed by:
- first power switches regulated by control circuits supplied by "bootstrap" capacitors and connecting phase windings to a positive terminal of the electrical network;
- second power switches connecting phase windings to an earth terminal of the electrical network;
and the fourth subroutine moreover charges these "bootstrap" capacitors.

In another particular embodiment of the device according to the invention, the control circuit is supplied by a "bootstrap" capacitor and the third subroutine also charges this "bootstrap" capacitor.

Benefit will be gained from a vehicle alterno-starter which according to the invention comprises a control device with the above features.

These few essential specifications will make the advantages provided by the invention compared to the background art obvious to the person skilled in the art.

The detailed specifications of the invention are given in the description below in conjunction with the accompanying drawings. It should be noted that these drawings are only aimed at illustrating the text of the description and do not in any way constitute a restriction in the scope of the invention.

DESCRIPTION OF THE PREFERRED EMBODIMENTS OF THE INVENTION

The preferred embodiments of the invention correspond to an inverter supplying a multiphase rotating electric machine with excitation 1 from a battery 2.

Figure 1:
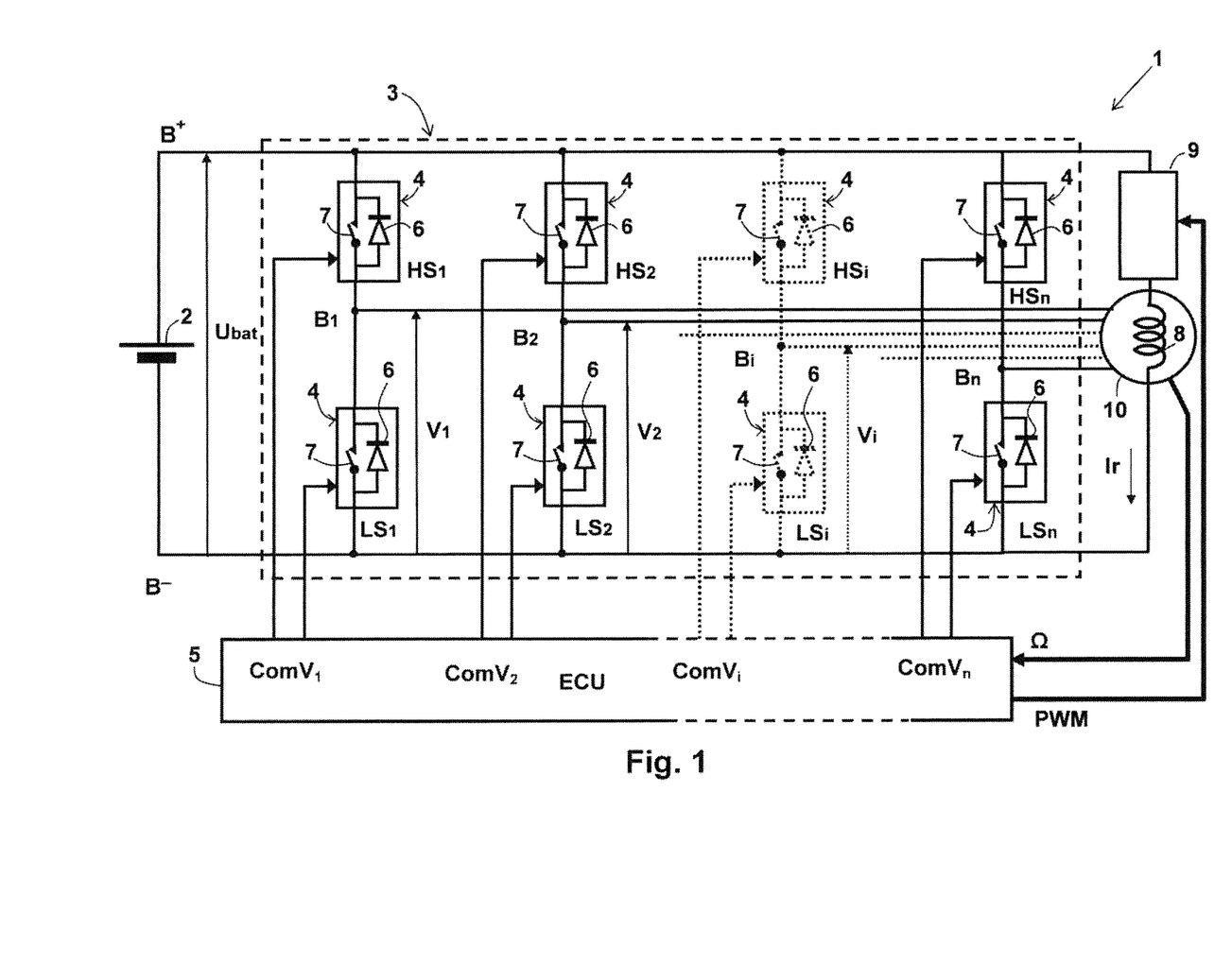
FIG. 1 is a simplified electrical diagram of a multiphase synchronous rotating electric machine with excitation of a type concerned by the invention.

In general it concerns a machine 1 with an n number of phase windings connected to the mid-points of arms $B_1$, $B_2$, $B_i$, $B_n$ of a power bridge 3 with semiconductors as illustrated on FIG. 1.

According to a known arrangement, power bridge 3 has arms $B_1$, $B_2$, $B_i$, $B_n$ each comprising controllable semiconductor switches 4 connecting, on the one hand, phase windings to the positive pole $B^+$ of battery 2 (upper semiconductor switches $HS_1$, $HS_2$, $HS_i$, $HS_n$ on the "high-side"), and, on the other hand, to the negative pole $B^-$ of battery 2 (lower semiconductor switches $LS_1$, $LS_2$, $LS_i$, $LS_n$ on the "low-side"), An electronic control unit 5 (or ECU, acronym of "Electronic Control Unit" in English terminology) alternately opens and closes the "high-side" and "low-side" switches 4 by means of control signals $ComV_1$, $ComV_2$, $ComV_i$, $ComV_n$, according to a well-known operation of an inverter 3, in order to control phase voltages $V_1$, $V_2$, $V_i$, $V_n$.

The semiconductor switches 4 used are preferably MOSFET type power transistors, intrinsic diode 6 of which provides the bidirectional current feature.

Alternatively semiconductor switches 4 consist of a commutation element 7 such as a bipolar power transistor 7 and a freewheel diode 6.

Here it concerns a machine with excitation 1, that is to say rotor 8 of which comprises an excitation winding through which a rotor excitation current Ir runs also regulated by the electronic control unit 5 by means of a control circuit 9 depending on a number of revolutions Ω and the required torque.

As indicated in the preamble, due to the commutation frequency of the semiconductor switches 4 being limited, it is necessary to pass from an MLI control mode of inverter 3 to a full wave control mode based on a number of nominal revolutions ranging between 4500 and 5000 rpm according to the type of machine 1.

This transition can create a current peak of several hundred amps in stator 10 without using the inventive control method.

In order to mitigate this drawback, the general principle of the invention thus consists in creating a pre-magnetization of stator 10 in open circuit by a rotor excitation current Ir before transition to full wave mode so that an electromotive peak force between phases is substantially equal to the supply voltage Ubat of inverter 3.

A reference value to which the rotor excitation current Ir is subjected in this pre-magnetizing stage is function of an electric pulsing of machine 1 and is given by the following equation:

$$i_{r,PreMag} = \frac{1}{K_e} \cdot \left( \frac{V_{DC}}{K.\omega_E} - \phi_0 \right)$$

where:
ωE is the electric pulsing equal to the number of revolutions Ω of machine 1 multiplied by a predetermined number of pairs of poles of machine 1;
$K_e$ is a mutual inductance between rotor 8 and stator 10;
φ0 is a remanent magnetic flux;
$V_{DC}$ is the nominal voltage of the on-board power system, that is to say the supply voltage Ubat;
and K equals $\sqrt{2}/\pi$.

Figure 2:
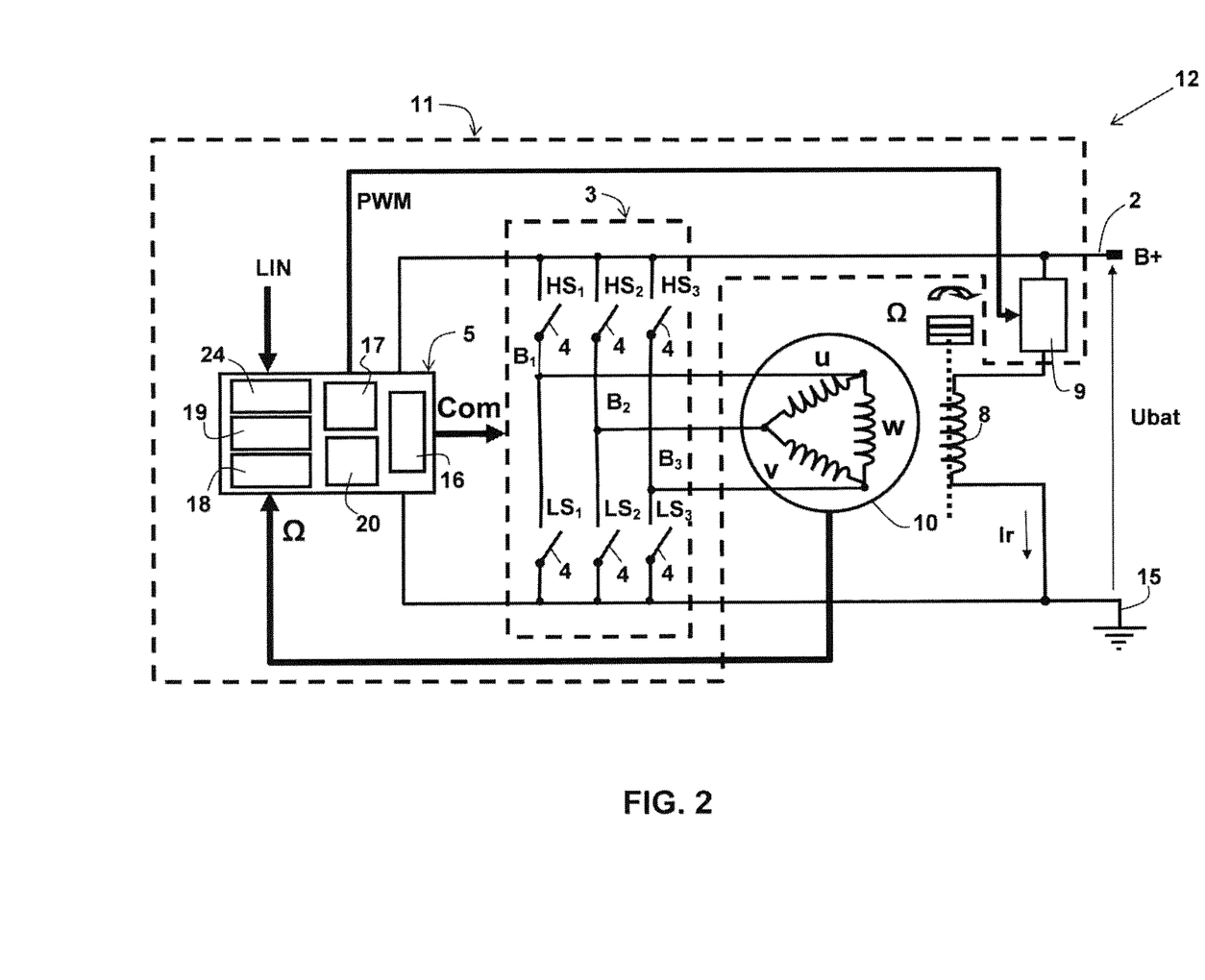
FIG. 2 is a simplified electrical diagram of a three phase synchronous rotating electric machine controlled by an inventive control device.
Figure 6:
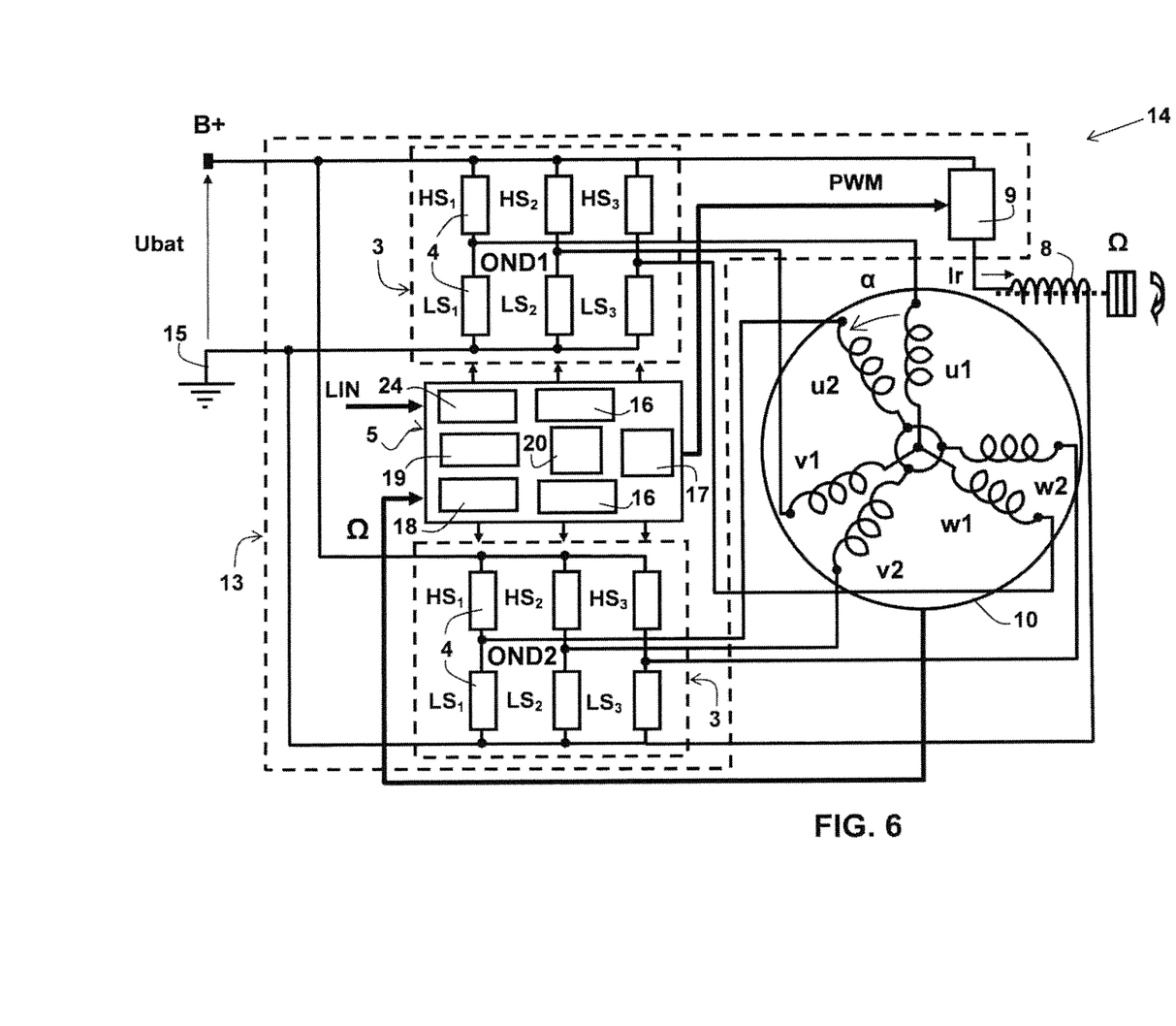
FIG. 6 is a simplified electrical diagram of a double three phase synchronous rotating electric machine controlled by another inventive control device by means of a double inverter.

The inventive method will be now explained in detail in conjunction, by way of example, with control device 11 of three phase rotating electric machine with excitation 12 shown on FIG. 2 or with the other control device 13 of double three phase rotating electric machine with excitation 14 shown on FIG. 6.

In three phase machine 12 illustrated on FIG. 2, inverter 3 supplies three phase windings u, v, w of stator 10 from on-board power system 2.

This inverter 3 comprises three arms $B_1$, $B_2$, $B_3$ formed by first power switches $HS_1$, $H_2$, $HS_3$ connecting these phase windings u, v, w to a positive terminal B⁺ of electrical network 2, and second power switches $LS_1$, $LS_2$; $LS_3$ connecting phase windings u, v, w to an earth terminal 15.

Electronic control unit 5 generates the first Com signals controlling inverter 3 by means of a first peripheral device 16, and a second PWM signal controlling control circuit 9 of the rotor excitation current Ir circulating in excitation winding 8 of the rotor by means of a second peripheral device 17.

Electronic control unit 5 also comprises means 18 to acquire the number of revolutions Ω and to compare this with the number of nominal revolutions.

A first subroutine or a second subroutine, stored in memory means 19, is carried out by a central processing unit 20 by means of first peripheral device 16 to generate the first Com signals so as to respectively produce first pulse width modulated phase voltages U, V, W or second full wave phase voltages U, V, W depending on a state of the means of comparison.

As the timing diagrams of the first signals ComUL, ComVL, ComWL; ComUH, ComVH, ComWH on FIG. 4 clearly show, the full wave control mode FW of the phase voltages U, V, W for t>t0, when the number of revolutions Ω is greater than the number of nominal revolutions, is preceded by a PreMag stage where stator 10 is not supplied by leaving open the first power switches $HS_1$, $HS_2$, $HS_3$ (ComUH, ComVH, ComWH permanently at zero level).

Figure 4:
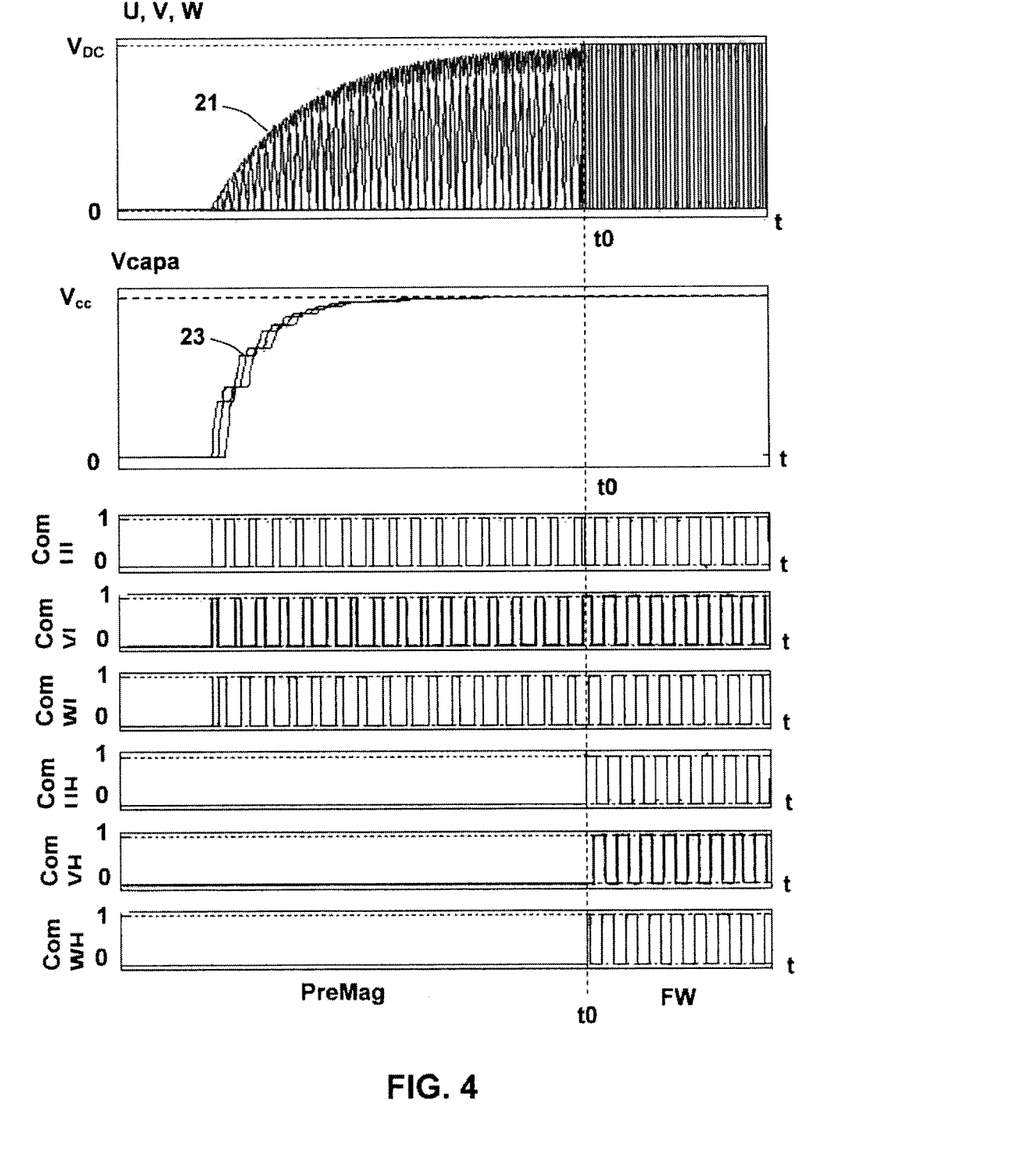
FIG. 4 shows timing diagrams of phase voltages, charging voltages at the terminals of the "bootstrap" capacitors and first signals controlling the inverter shown on FIG. 3.

In this PreMag stage a third subroutine stored in memory means 19 and carried out by central processing unit 20, determines the reference value for the rotor excitation current Ir and by means of second peripheral device 17 generates the second PWM signal enabling a magnetic pre-magnetizing flux to be created in stator 10.

The result is that the phase voltages U, V, W (that is to say the electromotive forces between phases FEM, stator 10 being in open circuit) slowly increase in effective value to reach the nominal voltage $V_{DC}$ as 21 in FIG. 4 clearly shows.

If control circuit 9 is floating and supplied by a "bootstrap" capacitor, it is charged by the third subroutine.

Figure 5A:
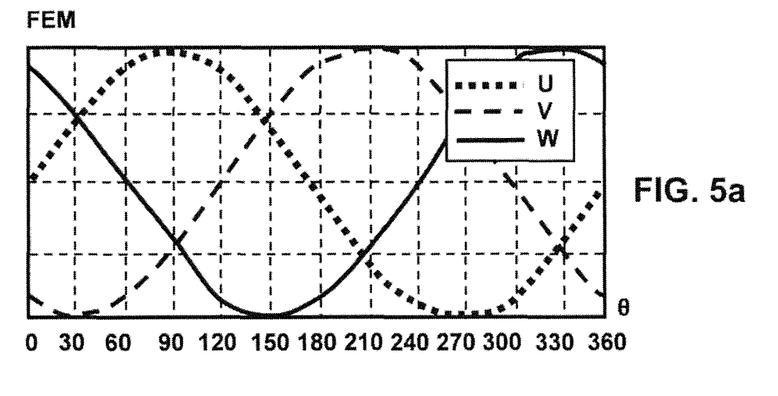
FIGS. 5a and 5b respectively depending on an electrical angle show the electromotive forces between phases of the three phase synchronous rotating electric machine shown on FIG. 2 and the first signals controlling the inverter shown on FIG. 3 in the pre-magnetizing stage of the inventive control method.
Figure 5B:
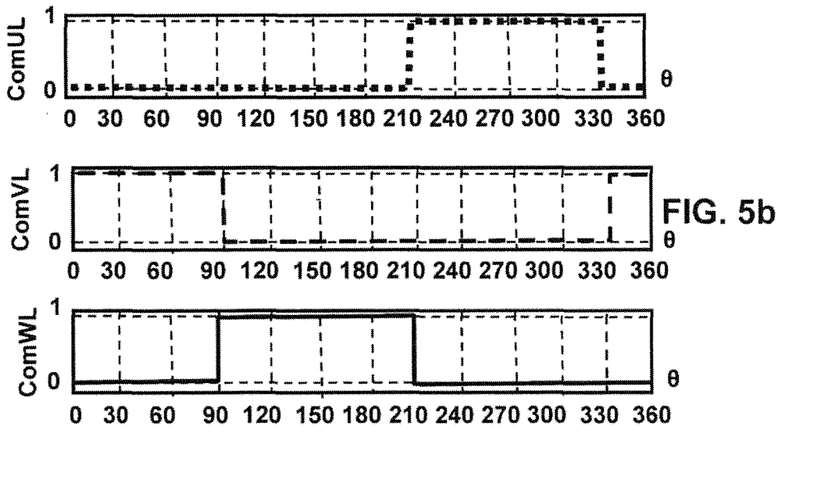

This pre-magnetization is effected by carrying out a fourth subroutine, stored in memory means 19, which generates first signals ComUL, ComVL, ComWL; ComUH, ComVH, ComWH depending on an electrical position 8 of rotor 8 of machine 12 so that only the one of the phases u, v, w with the lowest electromotive force between phases FEM is commutated to earth terminal 15, as illustrated by FIGS. 5*a* and 5*b*.

Commutation ranges of the second power switches $LS_1$, $LS_2$, $LS_3$ not being covered by the first signals ComUL, ComVL, ComWL, whereas the first power switches $HS_1$, $HS_2$, $HS_3$ are kept open by the first corresponding signals ComUH, ComVH, ComWH permanently at zero level, stator 10 is in open circuit.

Figure 3:
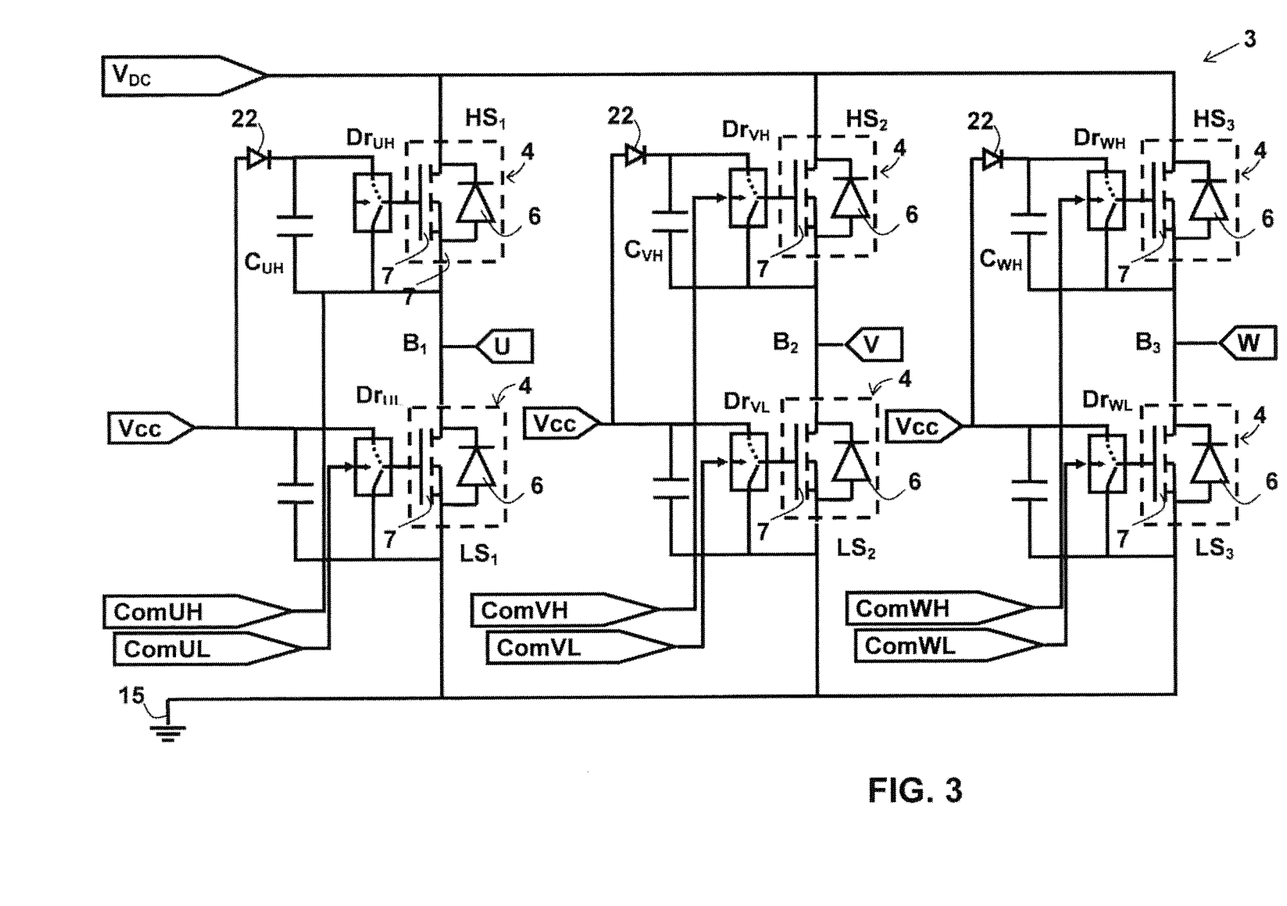
FIG. 3 is a general diagram of an embodiment of an inverter supplying the three phase synchronous rotating electric machine shown on FIG. 2, comprising "bootstrap" capacitors.

In a particular embodiment of inverter 3 shown on FIG. 3, the first and second power switches $HS_1$, $HS_2$, $HS_3$, $LS_1$, $LS_2$, $LS_3$ are regulated by control circuits $Dr_{UH}$, $Dr_{VH}$, $Dr_{WH}$, $Dr_{UL}$, $Dr_{VL}$, $Dr_{WL}$, supplied from an auxiliary voltage source Vcc. Control circuits $Dr_{UH}$, $Dr_{VH}$, $Dr_{WH}$ of the first float switches $HS_1$, $HS_2$, $HS_3$ are supplied by "bootstrap" capacitors $C_{UH}$, $C_{VH}$, $C_{WH}$ and charged by diodes 22 connected to the auxiliary voltage source Vcc.

In this configuration, the fourth subroutine applies a charge 23 to the "bootstrap" capacitors $C_{UH}$, $C_{VH}$, $C_{WH}$ when the second power switches $LS_1$, $LS_2$, $LS_3$ are in a transitional state, as will be clearly understood by referring to FIG. 4 (where Vcapa is a charging voltage of the "bootstrap" capacitors $C_{UH}$, $C_{VH}$, $C_{WH}$), these "bootstrap" capacitors $C_{UH}$, $C_{VH}$, $C_{WH}$ being connected, on the one hand to earth terminal 15 and, on the other hand, to the auxiliary voltage source Vcc by each diode 22.

The inventive control method described above for a three phase machine 12, applies in a similar way to double three phase machine 14 shown on FIG. 6.

A machine 14 of this type is constituted by two three phase systems which comprise two groups of three phase windings u1, v1, w1, u2, v2, w2 offset at a predetermined angle α, most often of 30°, in the same stator 10.

Each group of phase windings u1, v1, w1; u2, v2, w2 are supplied by inverter 3 controlled by first signals Com1, Com2 generated by first peripheral device 16 of electronic control unit 5.

This electronic control unit 5 with second peripheral device 17 also generates the second PWM signal which regulates control circuit 9 controlling the rotor excitation current Ir in rotor 8.

Depending on the number of revolutions Ω, prior to the first signals Com1, Com2 passing to full wave control mode, central processing unit 20 of electronic control unit 5 carries out the third and fourth subroutines for each three phase system to ensure pre-magnetization of stator 10 in open circuit and if required to charge the "bootstrap" capacitors $C_{UH}$, $C_{VH}$, $C_{WH}$, if these are contained in inverters 3 and the "bootstrap" capacitor of control circuit 9, if the latter is floating.

Figure 7A:
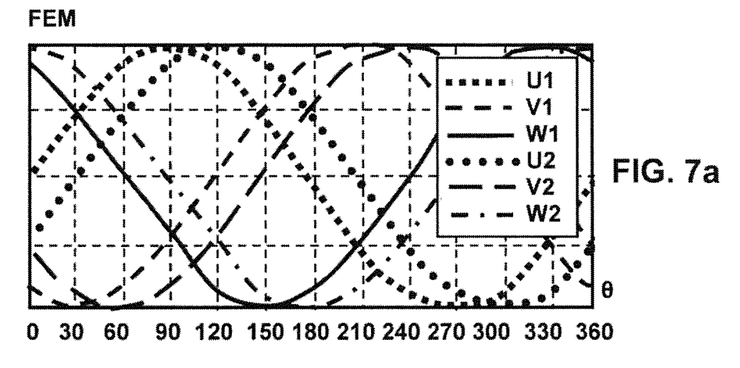
FIGS. 7a and 7b respectively depending on an electrical angle show the electromotive forces between phases of the three phase synchronous rotating electric machine shown on FIG. 6 and the first signals controlling the double inverter in the pre-magnetizing stage of the inventive control method.
Figure 7B:
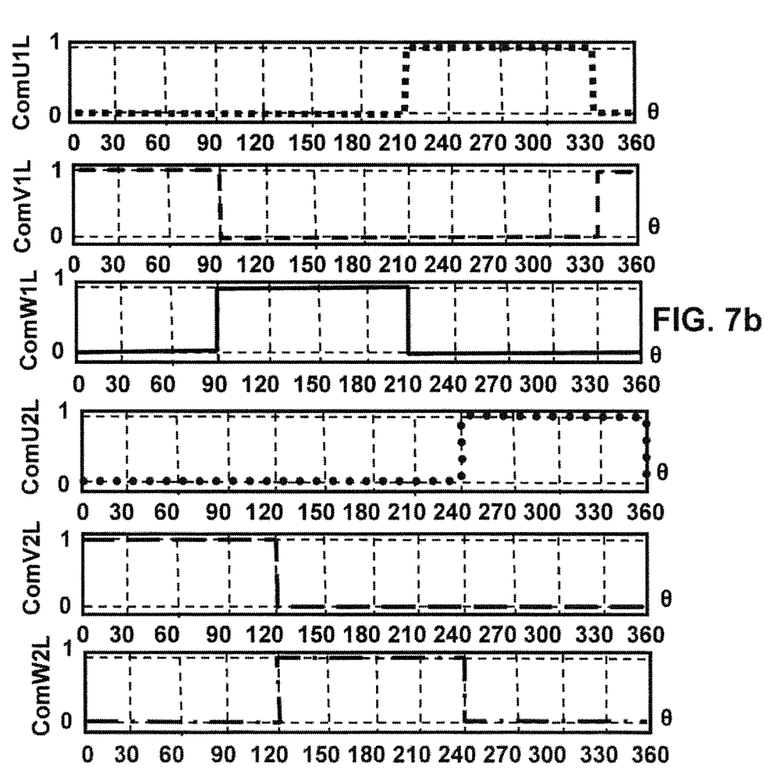

By referring to FIGS. 7a and 7b, it will be clearly understood that in order to control the first and second power switches $HS_1$, $HS_2$, $HS_3$, $LS_1$, $LS_2$, $LS_3$ of two inverters 3 by choosing first signals ComU1L, ComV1L, ComW1L, ComU2L, ComV2L, ComW2L identical to those for controlling inverter 3 of the three phase machine, stator 10 is kept in open circuit, while being able if required to charge the "bootstrap" capacitors $C_{UH}$, $C_{VH}$, $C_{WH}$ of inverters 3.

Electronic control unit 5 is preferably configured as a microcontroller or microprocessor, the firmware of which includes instructions representing the inventive method.

Inventive control device 11, 13 comprising inverter 3 or two inverters 3, electronic control unit 5 and control circuit 9 is advantageously integrated on the rear bearing of a vehicle alterno-starter 1, 12, 14.

It concerns a modern alterno-starter 1, 12, 14 which communicates with the engine control unit of the vehicle via an interface 24 for a LIN type earth network integrated in microcontroller or microprocessor 5.

As the current peak is reduced, the semiconductor commutation elements 4 do not need to be oversized.

The improvement is very noticeable: tests carried out by the inventive entity on a standard alterno-starter enabled it to be noted that a stator intensity amounting to 300 Aeff without pre-magnetization was reduced to 50 Aeff in the case of a reference value for the rotor excitation current Ir of 2 A when passing to full wave control at 4750 rpm.

This results in cost cutting which gives the inventive alterno-starter 1, 12, 14 an unquestionable competitive advantage.

It goes without saying that the invention is not limited to the sole preferred embodiments described above.

Timing diagrams of the phase voltages U, V, W; U1, V1, W1; U2, V2, W2 are only given by way of example for a three phase machine 12 and a double three phase machine 14; similar timing diagrams could illustrate a description relating to a machine 1 with a greater number of phases.

The range of digital values for the nominal number of revolutions is given for a type of alterno-starter 1, 12, 14 already marketed by the applicant which the inventive method and device are intended to improve.

Other digital values will be predetermined depending on the electromechanical properties of other types or models.

The invention thus embraces all possible alternative embodiments which would remain within the framework defined by the claims below.

The invention claimed is:

1. A method of controlling a multiphase synchronous rotating electric machine with excitation comprising:
a control stage in which currents of the phases in phase windings of a stator of said machine connected to an on-board power system supplied by a battery providing a predetermined nominal voltage are full wave controlled for when said machine operates in driving mode; and
preceding the control stage, a pre-magnetizing stage of said stator in open circuit, in which an electromotive peak force between phases substantially equal to said nominal voltage is created by a rotor excitation current of a rotor of said machine;
wherein said pre-magnetizing stage comprises determination of a reference value for said rotor excitation current depending on an electric pulsing of said machine;
wherein said reference value is given by the following equation:

$$I_{r,PreMag} = \frac{1}{Ke} \cdot \left( \frac{VDC}{K\omega E} - \emptyset 0 \right)$$

where:
ωE is said electric pulsing equal to a number of revolutions of said machine multiplied by a predetermined number of pairs of poles of said machine;
Ke is a mutual inductance between said rotor and said stator;
Ø0 is a remanent magnetic flux;
VDC is said nominal voltage; and
K is equal to $\sqrt{2}/\pi$.

2. The method of controlling a multiphase synchronous rotating electric machine with excitation according to claim 1, wherein said phase currents are controlled by an inverter comprising arms formed by first power switches controlled by control circuits supplied by "bootstrap" capacitors and connecting said phase windings to a positive terminal of said electrical network, and also formed by second power switches connecting said phase windings to an earth terminal of said electrical network, said pre-magnetizing stage moreover comprises a sequence of applying a charge to said "bootstrap" capacitors.

3. The method of controlling a multiphase synchronous rotating electric machine with excitation according to claim 2, wherein during said sequence said second power switches are controlled depending on an electrical position of said rotor so that only the one of the phases of said machine with the lowest electromotive force between phases is commutated to said earth terminal.

4. The method of controlling a multiphase synchronous rotating electric machine with excitation according to claim 3, wherein said pre-magnetizing stage is passed to said control stage when said rotor excitation current has reached said reference value and when said "bootstrap" capacitors are charged.

5. The method of controlling a multiphase synchronous rotating electric machine with excitation according to claim 1, wherein said rotor excitation current is controlled by a commutation element regulated by a control circuit supplied by a "bootstrap" capacitor, said "bootstrap" capacitor is charged before said pre-magnetizing stage.

6. A control device of a multiphase synchronous rotating electric machine with excitation configured to implement the method according to claim 1, the control device comprising:
an electronic control unit for controlling an inverter connected to an on-board power system supplied by a battery and configured to be connected to phase windings of a stator of said machine, and for controlling a control circuit connected to said on-board power system configured to be connected to an excitation winding of a rotor of said machine,
wherein said electronic control is configured:
to acquire a number of revolutions of said machine, and
to compare said number of revolutions with a predetermined number of nominal revolutions, wherein said electronic control unit comprises:

a first peripheral device to generate first signals controlling said inverter, a second peripheral device to generate a second pulse width modulated (PWM) signal regulating said control circuits, a central processing unit carrying out a first subroutine or a second subroutine by said first peripheral device to generate said first signals to respectively produce first pulse width modulated phase voltages or second full wave phase voltages depending on a state of said comparison, and for carrying out, prior to said second subroutine, a third subroutine to determine a rotor excitation current depending on said number of revolutions and by said second peripheral device to generate said second (PWM) signal so as to produce a magnetic pre-magnetizing flux in said stator and a fourth subroutine by said first peripheral device to generate said first signals to maintain said stator in open circuit, and a memory to memorize said first, second, third and fourth subroutines.

7. The control device of a multiphase synchronous rotating electric machine with excitation according to claim 6, wherein, said inverter comprising arms formed by first power switches regulated by control circuits supplied by "bootstrap" capacitors and connecting said phase windings to a positive terminal of said electrical network, and by second power switches connecting said phase windings to an earth terminal of said electrical network, said fourth subroutine moreover applies a charge to said "bootstrap" capacitors.

8. The control device of a multiphase synchronous rotating electric machine with excitation according to claim 6, wherein, said control circuit being supplied by a "bootstrap" capacitor, said third subroutine also applies a charge to said "bootstrap" capacitor.

9. A vehicle alterno-starter, comprising a control device according to claim 6 for when operating in driving mode.

* * * * *